United States Patent
Henry et al.

(10) Patent No.: US 12,309,885 B2
(45) Date of Patent: May 20, 2025

(54) POLICY-BASED WIRELESS INFRASTRUCTURE-INITIATED DEVICE ADDRESS ROTATIONS FOR A WIRELESS LOCAL AREA NETWORK

(71) Applicant: Cisco Technology, Inc., San Jose, CA (US)

(72) Inventors: Jerome Henry, Pittsboro, NC (US); Robert Edgar Barton, Richmond (CA); Stephen Michael Orr, Wallkill, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 440 days.

(21) Appl. No.: 17/720,490

(22) Filed: Apr. 14, 2022

(65) Prior Publication Data
US 2023/0336977 A1    Oct. 19, 2023

(51) Int. Cl.
| | | |
|---|---|---|
| H04W 12/02 | (2009.01) | |
| H04L 61/5069 | (2022.01) | |
| H04W 8/26 | (2009.01) | |
| H04L 101/622 | (2022.01) | |
| H04W 84/12 | (2009.01) | |

(52) U.S. Cl.
CPC .......... *H04W 8/26* (2013.01); *H04L 61/5069* (2022.05); *H04W 12/02* (2013.01); *H04L 2101/622* (2022.05); *H04W 84/12* (2013.01)

(58) Field of Classification Search
CPC ....... H04W 8/26; H04W 12/02; H04W 84/12; H04L 61/5069; H04L 2101/622; H04L 61/5053; H04L 61/5038
See application file for complete search history.

(56) References Cited

U.S. PATENT DOCUMENTS

| | | | |
|---|---|---|---|
| 11,050,746 B2* | 6/2021 | Gundavelli | ......... H04L 63/1475 |
| 2011/0004918 A1 | 1/2011 | Chow et al. | |
| 2017/0238183 A1 | 8/2017 | Keidar et al. | |
| 2020/0344203 A1* | 10/2020 | Mermoud | ........... H04L 61/5014 |
| 2021/0266316 A1 | 8/2021 | Gundavelli et al. | |

OTHER PUBLICATIONS

Andersdotter et al. ( IEEE 802.11 Randomized And Changing MAC address Topic interest Group Report), Nov. 2019.*
Cisco, "Cisco Cyber Vision Data Sheet", Cisco Public Data sheet, Aug. 2021, 14 pages.
Jerome Henry et al., "Enhanced Service With Randomized MAC Addresses", IEEE 802.11-20/0854r7, https://www.ieee802.org/, Sep. 2020, 126 pages.

* cited by examiner

*Primary Examiner* — Lakeram Jangbahadur
(74) *Attorney, Agent, or Firm* — Edell, Shapiro & Finnan, LLC (57) ABSTRACT

Techniques herein facilitate policy-based wireless infrastructure-initiated device address rotations for wireless devices of a wireless local area network (WLAN). In one example, a method may include obtaining device information for a plurality of wireless devices connected to the wireless network infrastructure; associating a first wireless device of the plurality of wireless devices with a Media Access Control (MAC) address rotation policy based on device information obtained for the first wireless device; determining that a MAC address rotation is to be performed for the first wireless device based on the MAC address rotation policy; and triggering the MAC address rotation for the wireless device via the wireless network infrastructure.

20 Claims, 5 Drawing Sheets

MAC ADDRESS ROTATION POLICIES
107

| Device Type | Device Firmware Version | Manufacturer Identity | MAC Address Rotation Frequency |
|---|---|---|---|
| TYPE 1 | OS Older than 12.1 | MFG #1 | Daily |
| TYPE 1 | OS 12.1 or later | MFG #1 | Weekly |
| TYPE 2 | N/A | MFG #2 | Never |
| TYPE 3 | N/A | MFG #3 | Never |
| TYPE 4 | N/A | MFG #4 | Never |
| TYPE 5 | N/A | MFG #5 | Every 3 days |
| TYPE 6 | N/A | MFG #6 | Never |

POLICY-BASED WIRELESS INFRASTRUCTURE-INITIATED DEVICE ADDRESS ROTATIONS FOR A WIRELESS LOCAL AREA NETWORK

TECHNICAL FIELD

The present disclosure relates to wireless communication, and specifically to the rotation or modification of device addresses to improve privacy.

BACKGROUND

In an effort to improve privacy of a wireless device user, many mobile operating system vendors are periodically changing (or "rotating") a device address (e.g., a station address) used to identify a wireless device on a wireless network. By changing the device address, it can be more difficult for an eavesdropper to track a location of a wireless device user, but also, in some circumstances, more difficult to monitor their online activities. While rotation of a wireless device's address can improve privacy, much of the legacy wireless network infrastructure was not designed to accommodate such address rotation, and in many cases, uses the device address as an identifier of the wireless device for a variety of processing.

DESCRIPTION OF EXAMPLE EMBODIMENTS

Overview

Embodiments disclosed herein provide a policy-based infrastructure to facilitate device address rotations, such as Media Access Control (MAC) address rotations (also referred to herein as randomized and changing Media Access Control (MAC) address (RCM) rotations), for wireless client devices or stations (STAs) for a wireless local area network (WLAN). MAC address changes for a wireless STA is generally viewed as a privacy improvement that helps obscure the identity of the wireless STA, thereby making it harder to track. In some instances, however, MAC address rotations can be a disruptive function for a wireless device, which can cause momentary disconnection of the device from the WLAN. Thus, in some instances, the MAC address of some wireless STAs that would be negatively impacted by such MAC address rotations should be kept stable, even if the STA has underlying driver support for MAC address rotation. Accordingly, presented herein is a policy-driven technique that allows an infrastructure to discover a wireless device category or class which a given wireless device is categorized/classified, and then identify and enforce a MAC address rotation policy for the device that is configured based on the category/class.

In some instances, the MAC address rotation policy for certain wireless devices may identify that no MAC address rotations are to be performed for such wireless devices. In some instances, a given wireless device may be identified to be within a certain class that are capable of performing MAC address rotations, however, after obtaining additional information from or associated with the given wireless device, it may be subsequently determined that MAC address rotations are not to be performed for the given wireless device. In such instances, an indication can be stored for the given wireless device that no MAC address rotations are to be performed for the given wireless device.

In one embodiment, a method is provided that may include obtaining device information for a plurality of wireless devices connected to the wireless network infrastructure; associating a first wireless device of the plurality of wireless devices with a Media Access Control (MAC) address rotation policy based on device information obtained for the first wireless device; determining that a MAC address rotation is to be performed for the first wireless device based on the MAC address rotation policy; and triggering the MAC address rotation for the wireless device via the wireless network infrastructure.

EXAMPLE EMBODIMENTS

For current randomized and changing Media Access Control (MAC) address (RCM) mechanisms typically utilized for a wireless local area networks (WLAN), wireless client devices or stations (STAs) can rotate their MAC address (generally referred to as MAC address rotation) at pseudo-random intervals. Current RCM mechanisms typically involve an infrastructure device, such as an access point (AP) or a wireless local area network (LAN) controller (WLC), which can initiate MAC rotation for clients on the WLAN, either on-demand or through an adaptive schedule.

MAC address changes for a wireless device is generally viewed as a privacy improvement that helps obscure the identity of the wireless STA, making it harder to track, thus improving overall privacy for a human user of the device. However, not all devices utilize or can operate in a normal manner if subjected to regular MAC address rotation(s).

While many wireless LANs are comprised of mobile user devices, there are also many device types that are not associated with a human user or do not include a robust user interface, such as Wi-Fi® asset tags, industrial Internet of Things (IoT) control devices, Wi-Fi mesh nodes (e.g., mesh APs (MAPs) or workgroup bridges), and the like. While such devices may support RCM mechanisms at the driver level, it is not always desirable, or even necessary, to have all classes of devices rotate their MAC addresses.

For example, an IoT asset tag that is used to track the location of a piece of equipment would have little use for RCM mechanisms. Similarly, a workgroup bridge, or an industrial automation wireless device may have little use for RCM mechanisms; rather, if one of these classes of devices were to suddenly have their MAC addresses change during an important operation (such as when a control message is sent to an automation device during a critical operation operation), not only would the wireless device be disconnected momentarily from the network (up to a few seconds), it could also result in application-layer impairment or severe damage to the physical devices using this wireless connection.

In accordance with embodiments herein, a policy-driven technique is provided that allows a wireless infrastructure to discover a wireless device category/classification and/or use, and then identify and enforce an RCM policy (or, more generally, a device address rotation policy or MAC address rotation policy) for the device. Broadly, embodiments herein provide techniques/systems through which the wireless infrastructure may probe and/or analyze associated wireless clients or devices to determine whether MAC address rotation or MAC address stability is preferred (or necessary) for various wireless devices within a WLAN, such as an Institute of Electrical and Electronics Engineers (IEEE) 802.11 WLAN. Further, policy-based techniques/systems are provided herein that allow a network administrator to define various device categories or classes within which different wireless devices are to be categorized, which allows the wireless infrastructure to make policy-based decisions on how to handle MAC address stability or rotation for different wireless devices.

Figure 1:
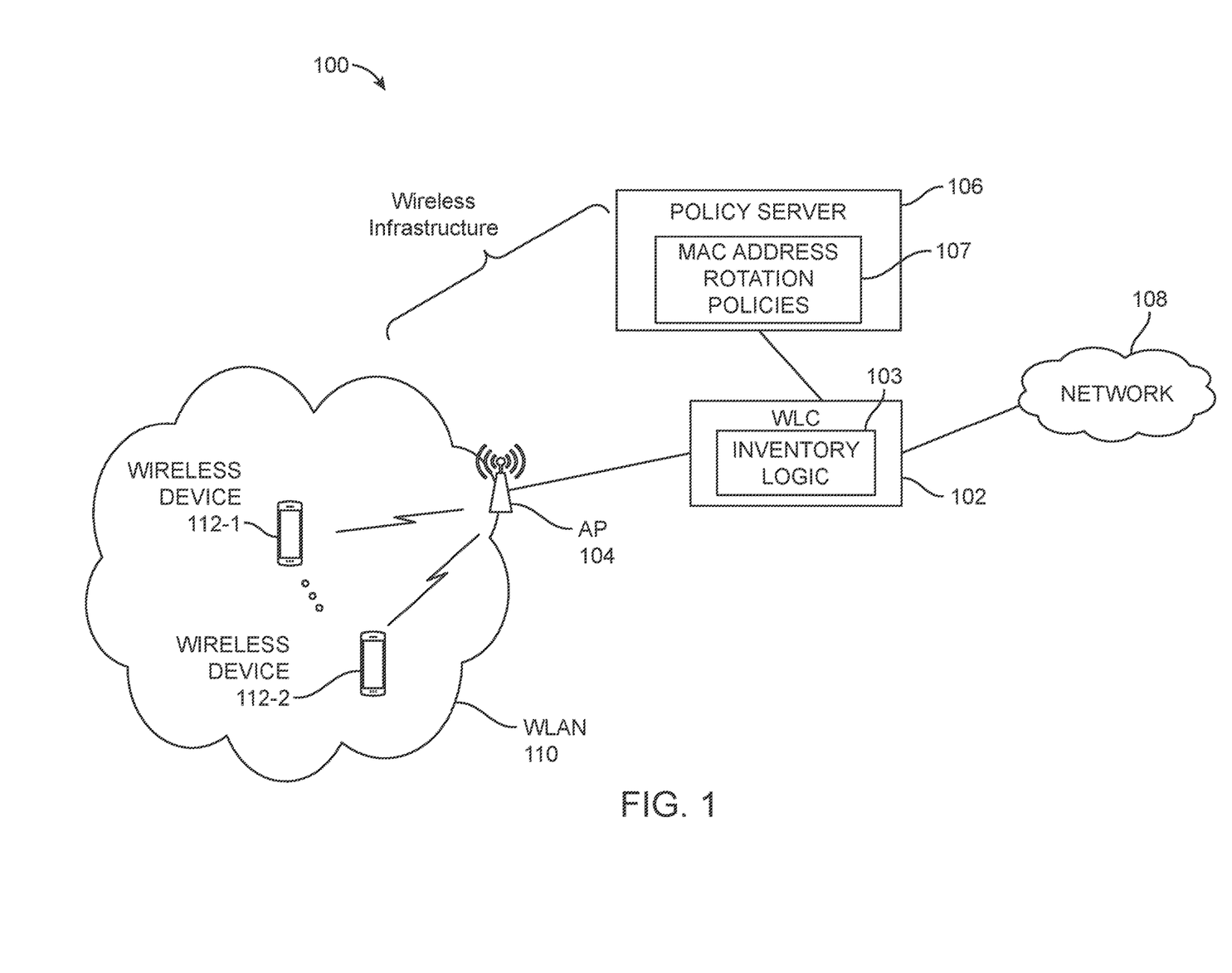
FIG. 1 is a block diagram of a system in which a policy-based wireless infrastructure may be implemented to initiate device address rotations for a wireless local area network (WLAN), according to an example embodiment.

With reference to FIG. 1 is a block diagram of a system 100 in which a policy-based infrastructure may be implemented to facilitate device address rotation (e.g., RCM/MAC address rotation) for a wireless local area network (WLAN), according to an example embodiment. As illustrated in FIG. 1, system 100 may include a wireless LAN controller (WLC) 102, at least one wireless access point (AP) 104, a policy server 106, a network 108, and a WLAN 110. Also shown in FIG. 1 are a number of wireless client stations (STAs) or devices 112-1 and 112-2. As shown in FIG. 1, WLC 102 may be configured with inventory logic 103 and policy server may be configured with a number of device address rotation policies, shown in FIG. 1 as MAC address rotation policies 107. Inventory logic 103 and MAC address rotation policies 107 are discussed in further detail herein, below.

Generally, WLC 102 is connected to and communicates with network 108, which may include one or more wide area networks (WANs), such as the Internet, and/or one or more LANs. WLC also communicates with and controls the AP 104, which serves WLAN 110 within which wireless device 112-1 and wireless device 112-2 can wirelessly connect to and be served by AP 104. WLC 102 may serve as a bridge to transport traffic (e.g., data packets) between network 108 and WLAN 110 (e.g., between network 108 and wireless devices 112-1 and 112-2).

Together, WLC 102, AP 104, and policy server 106 may represent and be referred to herein as a 'wireless infrastructure' or 'wireless network infrastructure'. AP 104 provides wireless connectivity, such as IEEE 802.11 wireless connectivity (and variants thereof) for wireless devices 112-1 and 112-2, which access WLC 102 and network 108 through the AP 104. During operation, wireless devices 112-1 and 112-2 perform 802.11 association and authentication to wirelessly attach/connect to WLAN 110 under control of WLC 102 in order to establish communication sessions within system 100. Once authenticated, wireless devices 112-1 and 112-2 may exchange packets with network 108 through AP 104 and WLC 102 during the communication sessions, in which case the WLC 102 forwards the packets between the network 108 and wireless devices 112-1 and 112-2. In the ensuing description, a wireless station or STA may be referred to interchangeably as a 'client device', 'wireless client', 'wireless STA', 'wireless client STA', and 'wireless client device', 'a client device configured to communicate wirelessly', and variations thereof.

Policy server 106 is configured with various MAC address rotation policies 107 (also referred to herein as device address rotation policies or RCM policies), in which each corresponding device address rotation policy is associated with a particular class of wireless devices and MAC address rotation frequency information. The MAC address rotation frequency information can indicate a MAC address rotation frequency that identifies a period of time for which MAC address rotations are to be performed for the class of wireless devices (e.g., frequency=once a day, frequency=once a week, frequency=every 3 hours, etc.) or can indicate that no MAC address rotations are to be performed for the class of wireless devices (e.g., frequency=0, 'never', 'NULL', 'stable representation' or the like indicating no MAC address rotations are to be performed). Each device address rotation policy may include various device information that can be used to identify whether a wireless device belongs to a particular class of devices and, thus, is associated with a particular MAC address rotation frequency, which can include no MAC address rotations being performed for the class of devices. In various embodiments, different combinations device information that can be used to identify a class of wireless devices, including, but not limited to, device type information, operating system (OS or O/S) and/or firmware information (e.g., version, number, etc.), manufacturer (mfg) identity, application information (e.g., applications operating on/via wireless devices of a particular class), operational behavior (e.g., various operations performed by wireless devices of a particular class), combinations thereof, and/or the like. In at least one embodiment, policy server 106 may be implemented as a Cisco® Identity Services Engine (ISE). Cisco® is a registered trademark of Cisco Technology, Inc.

Broadly during operation of system 100, wireless devices, such as wireless devices 112-1 and 112-2 can connect to WLAN 110 for communication sessions. WLC 102, via inventory logic 103, discovers/manages an inventory of the wireless devices 112-1 and 112-2 by gathering device information for the wireless devices 112-1 and 112-2 and providing the device information to policy server 106.

Using the device information obtained for each wireless device 112-1 and 112-2, policy server identifies a class of wireless devices within which each wireless device 112-1 and 112-2 belongs for a corresponding MAC address rotation policy for the class of wireless devices. The corresponding MAC address rotation policy for a given class of wireless devices includes, as noted above, MAC address rotation frequency information indicating either a MAC address rotation frequency (period of time) at which MAC address rotations are to be performed for the class of wireless devices or indicating that no MAC address rotations are to be performed for the class of wireless devices.

For each wireless device 112-1 and 112-2, the policy server 106 stores the MAC address rotation policy and, in particular, the MAC address rotation frequency for each corresponding wireless device 112-1 and 112-2, such that each corresponding wireless device 112-1 and 112-2 is registered with the policy server 106 along with the corresponding MAC address rotation frequency (e.g., a particular period of time/frequency or NULL/etc.) for each corresponding wireless device 112-1 and 112-2.

For instances in which MAC address rotations are to be performed for a given wireless device based on a given period of time/frequency being identified via a given MAC address rotation policy identified for the given wireless device, the policy server 106 can track the period of time and trigger a MAC address rotation for the given wireless device via the wireless infrastructure, such as WLC 102 and AP 104, upon the threshold period of time being met. In one example, the policy server 106 can track the period of time by initializing a count-up rotation timer, comparing the timer value to the threshold period of time, and triggering the MAC address rotation for the given wireless device via the wireless infrastructure upon the threshold period of time being satisfied. In another example, the policy server can track the period of time by initializing a count-down rotation timer set to the particular period of time and triggering the MAC address rotation for the given wireless device based on the rotation timer reaching zero. Other variations can be envisioned.

Figure 2A:
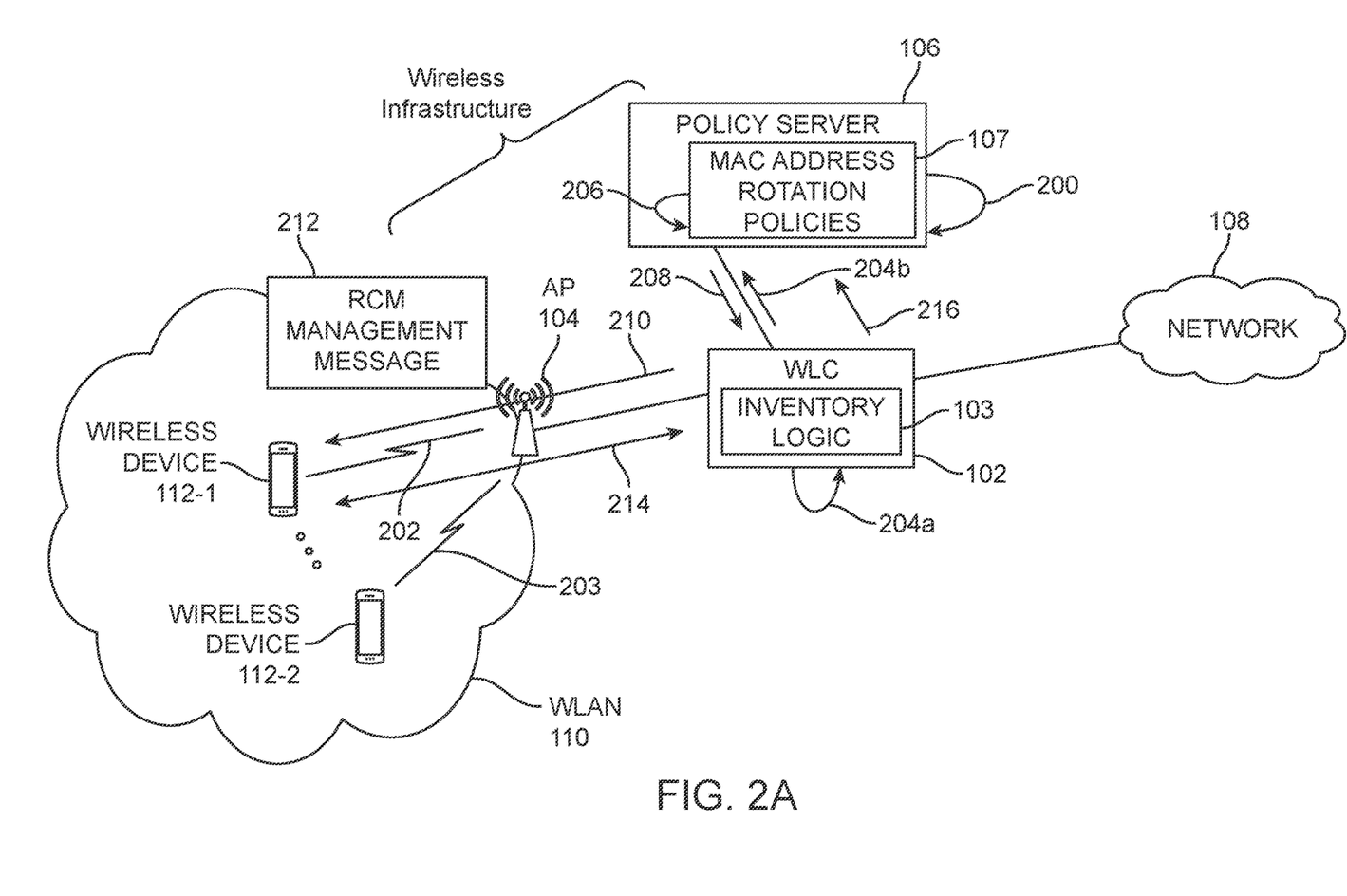
FIG. 2A is a block diagram illustrating various operations that may be performed via the system of FIG. 1 in order to implement the policy-based wireless infrastructure-initiated device address rotations, according to an example embodiment.
Figure 2B:
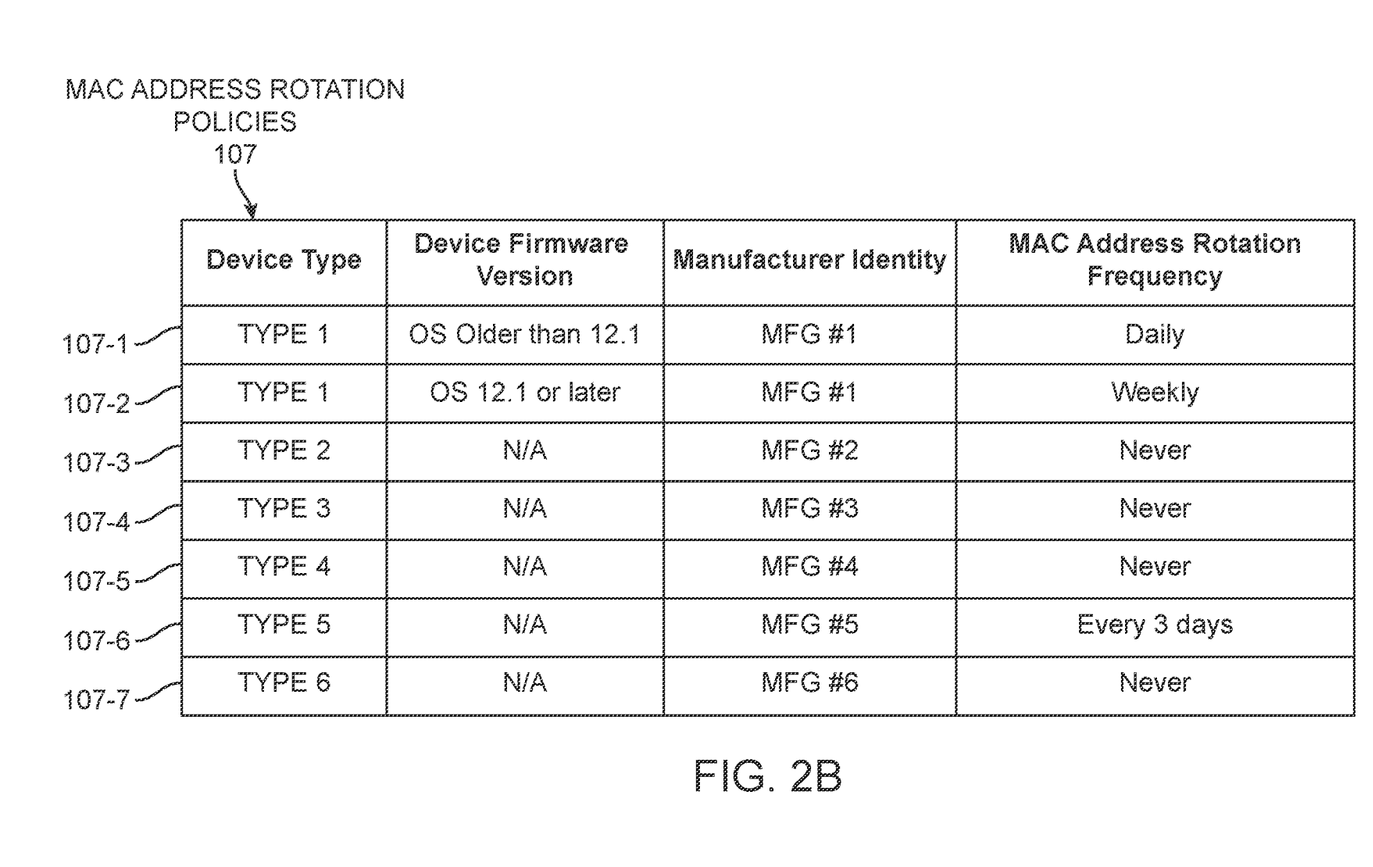
FIG. 2B is a diagram illustrating example device address rotation policies that may be configured for the system of FIG. 1, according to an example embodiment.

Consider an operational example involving wireless devices 112-1 and 112-2, as illustrated in FIG. 2A, which is a block diagram illustrating various operations that may be performed via system 100 in order to implement policy-based wireless infrastructure-initiated MAC address rotations, according to an example embodiment. FIG. 2B is a diagram illustrating example details for various MAC address rotation policies 107 that may be configured for policy server 106, according to an example embodiment.

At 200, consider that a number of MAC address rotation policies 107 (also referred to herein as device address rotation policies or RCM policies) are configured for policy server 106. FIG. 2B illustrates seven generic policy container examples of example MAC address rotation policies 107-1, 107-2, 107-3, 107-4, 107-5, 107-6, and 107-7 for various classes of wireless devices. As shown in FIG. 2B, each corresponding MAC address rotation policy 107-1 through 107-7 may include device information, such as a device type, a device firmware and/or OS version, device operating system version, and a manufacturer identity for the class of wireless devices associated with each corresponding MAC address rotation policy 107-1 through 107-7. Each corresponding MAC address rotation policy 107-1 through 107-7 further identifies MAC address rotation frequency information for the class of wireless devices associated with each corresponding MAC address rotation policy 107-1 through 107-7.

Device type information for a given class of wireless devices associated with a given MAC address rotation policy may include any descriptive and/or other information, identifier, etc. that may be used to identify/delineate different types of wireless devices. For the embodiment of FIG. 2A, different wireless device types, numbered 1 through 6, are shown, which may be representative of any types of wireless devices, such as mobile user devices, Apple® iOS devices, Wi-Fi asset tags, IoT devices, wireless human-machine interface (HMI) devices, workgroup bridges, Samsung Galaxy® devices, edge compute devices, etc. Apple® is a registered trademark of Apple Inc. Samsung Galaxy® is a registered trademark of Samsung Electronics, Co., Ltd.

As illustrated in FIG. 2A, classes of wireless devices associated with different MAC address rotation policies may be delineated not only by device type, but also any other combination of device information. For example, FIG. 2A illustrates that MAC address rotation policy 107-1 and MAC address rotation policy 107-2 are both associated with the same device type (Type 1) and the same manufacturer (MFG #1) but include different MAC address rotation frequencies (e.g., daily for policy 107-1 and weekly for policy 107-2) depending on the OS version for each class of devices.

Thus, it is to be understood that device information stored for a given class of devices associated with a given MAC address rotation policy and corresponding MAC address rotation frequency may be varied in any manner. For example, in some instances, MAC address rotation policies may further include application information for one or more applications operating on/via a certain class of wireless devices may further identify operational behavior/expected operations for a certain class of wireless devices, combinations thereof, and/or the like.

As noted above, MAC address rotation frequency information for each class of wireless devices associated with each corresponding MAC address rotation policy can indicate a MAC address rotation frequency that identifies a period of time for which MAC address rotations are to be performed for the class of wireless devices (e.g., frequency=once a day, frequency=once a week, frequency=every 3 hours, etc.) or can indicate that no MAC address rotations are to be performed for the class of wireless devices (e.g., frequency=0, 'never', 'NULL', 'stable representation' or the like indicating no MAC address rotations are to be performed). As illustrated in FIG. 2A, MAC address rotation policies 107-3, 107-4, 107-5, and 107-6 each indicate a MAC address rotation frequency of 'Never', indicating that no MAC address rotations are to be performed for the classes of wireless devices associated with each of the corresponding MAC address rotation policies 107-3, 107-4, 107-5, and 107-6.

In some embodiments, each of one or more corresponding MAC address rotation policies 107 may be configured by a network administrator for an entity (e.g., enterprise entity, etc.) that manages/operates the wireless infrastructure/ WLAN 110. In some embodiments, a preferred MAC address rotation policy for a certain class of devices may be set/defined by a given device manufacturer, such as via Manufacturer Usage Description (MUD) file. In still some embodiments, the policy server 106 could also leverage behavioral aspects for wireless devices to influence a MAC address rotation policy. For example, if a given class of wireless devices are determined to use application-level commands that are deemed critical (such as turning device power of on/off), the MAC address rotation frequency of such devices could be influenced.

As illustrated at 202 in FIG. 2A, consider that wireless device 112-1 is connected to AP 104 for a WLAN 110 communication session in which control/data traffic (e.g., packets) is communicated between wireless device 112-1 and network 108 via AP 104 and WLC 102. Further, consider at 203 that wireless device 112-1 is connected to AP 104 for a WLAN 110 communication session in which control/data traffic (e.g., packets) is communicated between wireless device 112-2 and network 108 via AP 104 and WLC 102.

With the generic policy containers created for different classes of wireless devices that are associated with different MAC address rotation policies 107, the policy server 106 can map each active wireless device 112-1 and 112-2 in the WLAN 110 to a corresponding MAC address rotation policy 107-1, 107-2, 107-3, 107-4, 107-5, 107-6, or 107-7. To accomplish such functionality, WLC 102, via inventory logic 103, continuously gathers and/or updates a live inventory of all wireless devices discovered for the WLAN 110, as illustrated generally at 204*a*.

Inventory discovery may be through a variety of available techniques now known in the art or hereafter developed. For example, in one embodiment, inventory logic 103 utilize Application Visibility and Control (AVC), Cisco Cyber Vision®, and/or the like to perform a live inventory of active devices in the WLAN 110. Cyber Vision® is a registered trademark of Cisco Technology, Inc.

Tools like Cyber Vision® have the advantage of providing insights beyond just the device type and manufacturer, which can generally be learned through a burned-in address (BIA) MAC address. Through packet sniffing capabilities, Cyber Vision® is able to determine device firmware and behavior (for example, does a given device use supervisory control and data acquisition (SCADA) or another important industrial protocol)—elements which can become part of the policy control provided via policy server 106. In some instances, device traffic type may also be determined by the WLC 102/inventory logic 103 and/or device identity may also be visible in the device traffic (e.g., universal plug and play (UPNP) traffic, multicast Domain Name System (mDNS) traffic, or the like that may include a device identifier in message source information). In various embodiments, WLC 102/inventory logic 103 can provide device information to policy server 106 via an Application Programming Interface (API), webhook, or the like.

As the inventory/device information is gathered/discovered for wireless devices 112-1 and 112-2 (e.g., as shown 204a), WLC 102/inventory logic 103 provides the device information to the policy server 106 for wireless devices 112-1 and 112-2, as shown at 204b. As generally illustrated at 206, the device type, manufacturer, software version, and/or any other device information (e.g., usage, etc.) obtained by the policy server 106 for each wireless device 112-1 and 112-2 is matched by the policy server 106 to a corresponding MAC address rotation policy as configured for each device class.

Upon identifying a corresponding MAC address rotation policy for each wireless device 112-1 and 112-2, MAC address rotation frequency information for a corresponding policy is stored in association with each wireless device 112-1 and 112-2. For example, consider for the embodiment of FIG. 2A that wireless device 112-1 is identified by policy server 106 as belonging to a class of wireless devices associated with MAC address rotation policy 107-1 that includes MAC address rotation frequency information indicating a rotation frequency or period of time at which MAC address rotations are to be performed for the wireless device 112-1 that is set to 'Daily' (i.e., once a day). For example, policy server 106 can obtain device information from WLC 102 that identifies that wireless device 112-1 is a Type 1 device, manufactured by MFG #1, and has an operating system (OS) older than version 12.1, which policy server 106 matches to MAC address rotation policy 107-1 that includes MAC address rotation frequency information indicating a rotation frequency or period of time at which MAC address rotations are to be performed for the wireless device 112-1 that is set to 'Daily'.

Further, consider for the embodiment of FIG. 2A that wireless device 112-2 is identified as belonging to a class of wireless devices associated with MAC address rotation policy 107-4 that includes MAC address rotation frequency information indicating a rotation frequency of 'Never', indicating that no MAC address rotations are to be performed for wireless device 112-2.

Thus, upon determining that MAC address rotations are to be performed for wireless device 112-1, policy server 106 can initiate a timer to track address rotation(s) for the wireless device 112-1. When the policy indicates that the device's MAC address has aged out (e.g., expiration of the timer), the policy server 106 can trigger a MAC address rotation instruction for the wireless device 112-1 via the wireless infrastructure as shown, for example, at 208. In one instance, policy server 106 can trigger a MAC address rotation for a given wireless device by issuing the instruction to the wireless infrastructure, such as to WLC 102 or AP 104 via an API, requesting the infrastructure to issue/perform a MAC address rotation function for the wireless device.

After receiving the instruction (e.g., RCM instruction) from the policy server 106, the WLC 102/AP 104 issues a MAC address rotation management command, referred to herein as an RCM management command, over the air to the wireless device 112-1, as generally illustrated at 210 in which the RCM management command is included in an RCM management message 212. It is noted that the policy server 106 is authoritative for the MAC address rotation policy and, initiation of a MAC address rotation for a given wireless device, rather than the WLC 102 or the AP 104. That is, infrastructure elements such as the WLC 102 or the AP 104 may not attempt to rotate MAC addresses for wireless devices in WLAN 110 unless instructed by the policy server 106. Thus, wireless devices that are determined to use a stable MAC address (e.g., rotation frequency=never) will not be forced to rotate in accordance with embodiments herein. Rather, only wireless devices with a matching policy indicating that MAC address rotations are to be performed at a given (non-zero) rotation frequency will be subjected to RCM operations.

In various embodiments, an RCM management message, such as RCM management message 212 may include any form of command, instruction, query, request (e.g., requesting a wireless device to rotate its MAC address), and/or the like indicating that a given wireless device, such as wireless device 112-1 is to rotate its MAC address. In at least one embodiment, RCM management message 212 may be a Robust Action Frame. Generally, Robust Action frames are management frames that are protected via the 802.11w Protected Management Frames (PMF) service, which provides for protecting frames through source validation and/or payload protection. For example, Robust Action Frames can carry content in a protected payload in order to hide the content from a potential eavesdropper's view. Accordingly, in at least one embodiment, the RCM management message 212 may be a Robust Action Frame that may carry in its payload any combination of information that may trigger a wireless device to perform a MAC address rotation, such as an instruction to perform an immediate MAC address rotation, a non-zero delay timer value (e.g., indicating that the wireless device is to perform a MAC address rotation upon expiration of a delay timer), a rotation schedule, and/or any variation thereof.

Upon triggering the MAC address rotation for the wireless device 112-1, the wireless device may rotate/update its MAC address and perform a re-association/authentication exchange with the wireless infrastructure, as generally illustrated at 214, in which the wireless device 112-1 uses a new MAC address. During the exchange, an 802.1X authentication may be performed in which the wireless device presents a certificate to an authentication server (not shown), such as an Authentication, Authorization, and Accounting (AAA) server, which shares the certificate owner value back with the wireless infrastructure, such that the infrastructure (e.g., AP 104/WLC 102) can authenticate the device to (re) connect to the WLAN 110 and confirm the MAC address rotation for the wireless device 112-1.

Once the wireless infrastructure (e.g., WLC 102/AP 104) issues the MAC address rotation command to the wireless device 112-1 and confirms that the MAC address for the wireless device 112-1 has been changed, the WLC 102/AP 104 sends a communication back to the policy server 106, as shown at 216, informing the policy server 106 of the MAC address change for the wireless device 112-1. The policy server can reset its rotation timer for the wireless device 112-1 and continue tracking/triggering MAC address rotations for the wireless device 112-1.

Although the example operations discussed for wireless device 112-1 involve the wireless device successfully performing a MAC address rotation, in some instances a given wireless device may be identified as belonging to a class of wireless devices that are capable of performing MAC address rotations (e.g., wireless devices in which MAC address rotations may be activated by default in a driver of the devices) but which, upon triggering a first MAC address rotation for the given wireless device, the device may inform the wireless infrastructure that the given wireless device does not support RCM management functions/MAC address rotations. In such instances, the MAC address rotation frequency for such a wireless device can be updated and set to 'Never', 'stable representation,' or any other indication that identifies that no MAC address rotations are to be performed for the device.

Thus, policy server 106 can identify devices for which MAC address rotations are not to be performed based on either matching wireless device information obtained for a given wireless device to a MAC address rotation policy that identifies that no MAC address rotations are to be performed for the given wireless device (e.g., such as wireless device 112-2, discussed for the example above) or upon obtaining an indication from the given wireless device (upon attempting a first MAC address rotation for the given wireless device) that indicates that no MAC address rotations are to be performed for the given wireless device. In such instances, the AP 104/WLC 102 can create a stable identifier MAC address for such a wireless device and, thereafter, identify the MAC address rotation policy change for the device and continue representing the device with the same MAC address throughout its communication session for the WLAN 110.

In some embodiments, the policy server 106 may flag such devices (e.g., to a network administrator) for which no MAC address rotations are to be performed as policy non-compliant. In still some embodiments, the policy server 106 can push the device policy for such a non-compliant wireless device to a device management platform (e.g., an IoT management platform, a Mobile Device Management (MDM) platform, etc.), which can update the wireless device so as to receive a configuration update at its next maintenance cycle, in order to configure the device to be capable of performing MAC address rotations, if desired for the wireless device.

Accordingly, a policy-based RCM service is provided in accordance with techniques herein that may be based on the type and function of different wireless devices. For example, types of wireless devices such as wireless tags, IoT devices, etc. may be identified as belonging to classes of devices having a stable MAC address that may not rotate or may be sent an instruction to rotate. Thus, the wireless network infrastructure can profile wireless devices in a WLAN in accordance with technique herein and then decides when or if a MAC address is to be rotated for wireless devices, thereby facilitating policy based RCM for each client in the WLAN.

Figure 3:
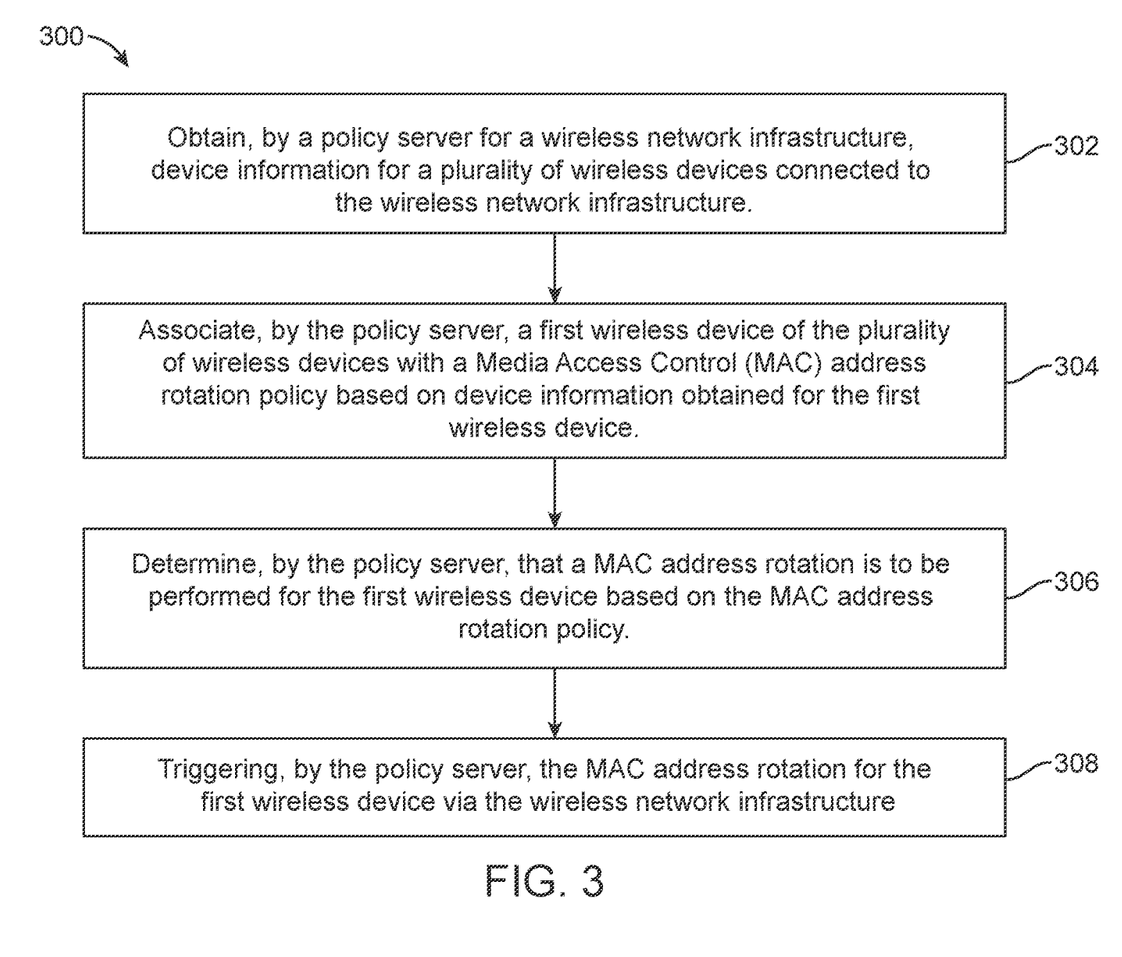
FIG. 3 is a flow chart depicting a method according to an example embodiment.

FIG. 3 is a flow chart depicting a method 300 according to an example embodiment. In at least one embodiment, method 300 may be performed by a policy server of a wireless local area network infrastructure, such as policy server 106 as illustrated in FIG. 1.

Prior to performing 300, the policy server for the wireless local area network infrastructure can be configured with a plurality of MAC address rotation policies in which of a wherein each of a particular MAC address rotation policy of the plurality of MAC address rotation policies includes a combination of device information that can to be used to identify the particular MAC address rotation policy for each of a given wireless device of a plurality of wireless devices connected to the wireless local area network; and rotation frequency information that indicates one of: a period of time for which MAC address rotations are to be performed for the particular MAC address rotation policy; or that no MAC address rotations are to be performed for the particular MAC address rotation policy.

At 302, the method may include the policy server obtaining device information for a plurality of wireless devices connected to a wireless network infrastructure (e.g., as discussed for 204a/204b, above). At 304, the method may include the policy server associating a first wireless device of the plurality of wireless devices with a MAC address rotation policy based on device information obtained for the first wireless device (e.g., as discussed at 206, above). As noted, the MAC address rotation policy may include rotation frequency information such that the associating operations may include matching the device information obtained for the first wireless device with device information stored for the MAC address rotation policy and storing the rotation frequency information included in the MAC address rotation policy in association with the first wireless device. In at least one embodiment, the method may include initiating a timer to track when a MAC address rotation is to be performed for the wireless device.

At 306, the method may include the policy server determining that a MAC address rotation is to be performed for the first wireless device based on the MAC address rotation policy. In various embodiments, the determining at 306 may include determining that a threshold period of time is satisfied based, on the MAC address rotation policy, for performing the MAC address rotation based on a count-up timer satisfying a certain threshold time or a count-down timer reaching zero.

At 308, the method may include the policy server triggering the MAC address rotation for the first wireless device via the wireless network infrastructure (e.g., as discussed at 208, above). In one embodiment, the triggering at 308 may include the policy server sending a MAC address rotation instruction to a WLC/AP (e.g., WLC 102/AP 104) that identifies that a MAC address rotation is to be performed for the wireless device, which can cause the WLC/AP to send an RCM management message (e.g., RCM management message 212) to the wireless device to trigger the wireless device to perform the MAC address rotation.

Figure 4:
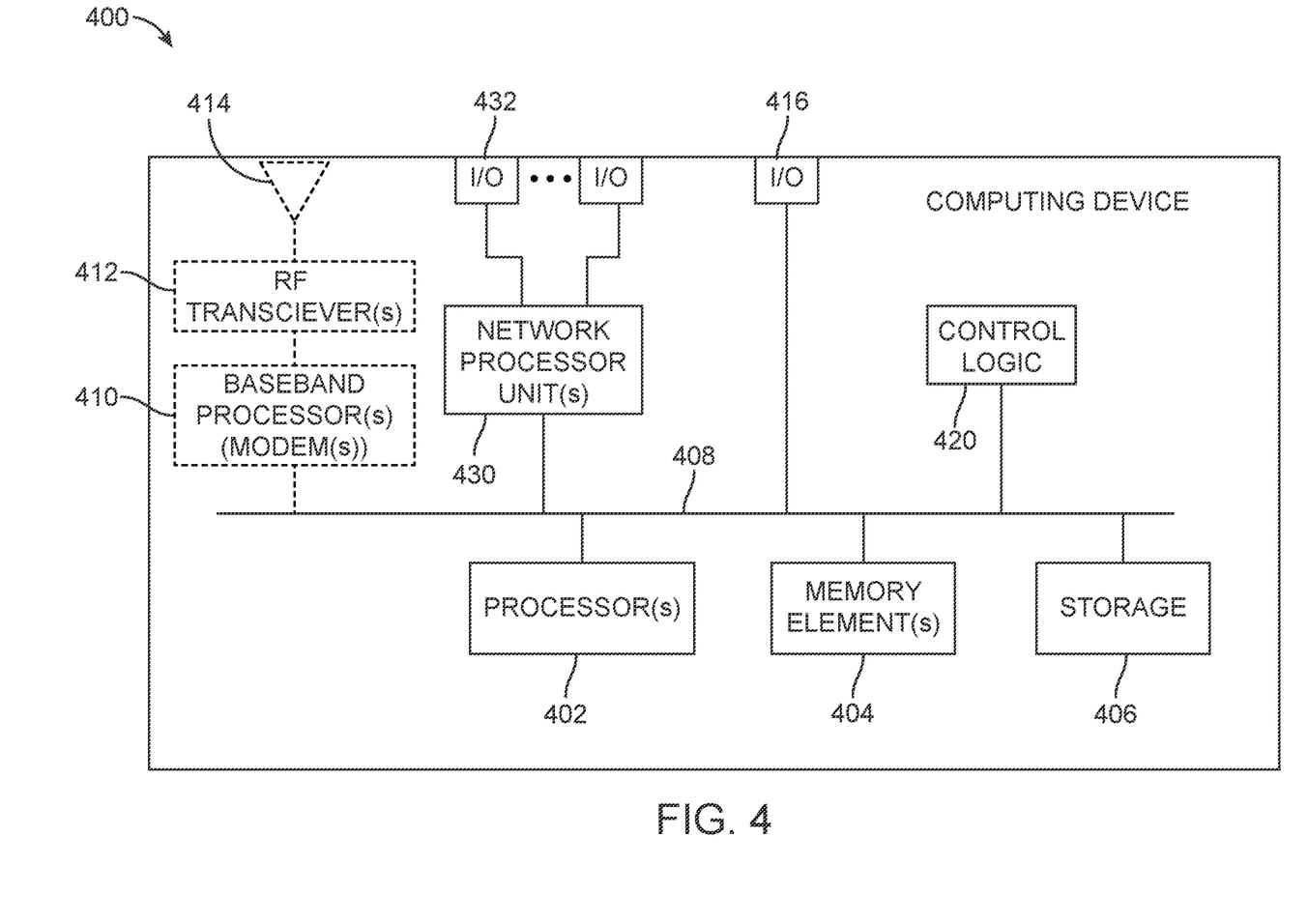
FIG. 4 is a hardware block diagram of a computing device that may perform functions associated with operations discussed herein and/or in connection with the techniques depicted in any one or more of FIGS. 1, 2A, 2B, and 3.

FIG. 4 is a hardware block diagram of a computing device 400 that may perform functions associated with operations discussed herein above and/or in connection with the techniques depicted in any one or more of FIGS. 1, 2A, 2B, and 3. In various embodiments, any of devices, such as policy server 106, WLC 102, AP 104, and/or wireless devices 112-1 and 112-2 discussed above may implement, in some embodiments, a computing/radio architecture analogous to that described below with respect to the computing device 400.

In at least one embodiment, computing device 400 may be any apparatus that may include one or more processor(s) 402, one or more memory element(s) 404, storage 406, a bus 408, one or more I/O interface(s) 416, control logic 420, one or more one network processor unit(s) 430 and one or more network I/O interface(s) 432. In various embodiments, instructions associated with logic for computing device 400 can overlap in any manner and are not limited to the specific allocation of instructions and/or operations described herein.

For embodiments in which computing device 400 may be implemented as an AP (e.g., AP 104) or a wireless device (wireless device 112-1 or wireless device 112-2), computing device may further include at least one baseband processor or modem 410, one or more radio RF transceiver(s) 412, one or more antenna(s) or antenna array(s) 414.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, graphical processing units (GPUs), microprocessors, digital signal processor, baseband signal processor, modem, physical layer (PHY), computing devices, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that are configured for computing device 400. In at least one embodiment, bus 408 is implemented as a fast kernel-hosted interconnect, potentially using shared memory between processes (e.g., logic), which can enable efficient communication paths between the processes.

Network processor unit(s) 430 may enable communication between computing device 400 and other systems, devices, or entities, (e.g., WLC 102, etc.) via network I/O interface(s) 432 (wired and/or wireless) to facilitate operations discussed for various embodiments described herein. In various embodiments, network processor unit(s) 430 can be configured as a combination of hardware and/or software, such as one or more Ethernet driver(s) and/or computing device(s) or interface cards, Fibre Channel (e.g., optical) driver(s) and/or computing device(s), wireless receivers/transmitters/transceivers, baseband processor(s)/modem(s), and/or other similar network interface driver(s) and/or computing device(s) now known or hereafter developed to enable communications between computing device 400 and other systems, devices, or entities to facilitate operations for various embodiments described herein. In various embodiments, network I/O interface(s) 432 can be configured as one or more Ethernet port(s), Fibre Channel ports, any other I/O port(s), and/or antenna(s)/antenna array(s) now known or hereafter developed. Thus, the network processor unit(s) 430 and/or network I/O interface(s) 432 may include suitable interfaces for receiving, transmitting, and/or otherwise communicating data and/or information (wired and/or wirelessly) in a network environment.

I/O interface(s) 416 allow for input and output of data and/or information with other entities that are connected to computing device 400. For example, I/O interface(s) 416 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen. In some embodiments, the computing device 400 supports a display having touch-screen display capabilities.

For embodiments in which computing device 400 is implemented as a wireless device or an AP, the RF transceiver(s) 412 may perform RF transmission and RF reception of wireless signals via antenna(s)/antenna array(s) 414, and the baseband processor (modem) 410 performs baseband modulation and demodulation, etc. associated with such signals to enable wireless communications for computing device 400.

In various embodiments, control logic 420 can include instructions that, when executed, cause processor(s) 402 to perform operations, which can include, but not be limited to, providing overall control operations of computing device 400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, institute of electrical and electronics engineers (IEEE) 802.11, Wi-Fi®, Wi-Fi6®, IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, access points, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 4) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a computer-implemented method is provided, which may include obtaining device information for a plurality of wireless devices connected to the wireless network infrastructure; associating a first wireless device of the plurality of wireless devices with a Media Access Control (MAC) address rotation policy based on device information obtained for the first wireless device; determining that a MAC address rotation is to be performed for the first wireless device based on the MAC address rotation policy; and triggering the MAC address rotation for the first wireless device via the wireless network infrastructure. The MAC address rotation policy may be associated with a class of wireless devices that includes the first wireless device. The wireless network infrastructure may further include at least one wireless controller or at least one wireless access point.

The triggering can be performed based on rotation frequency information included in the MAC address rotation policy. In one instance, the associating may further include matching the device information obtained for the first wireless device with device information stored for the MAC address rotation policy; and storing the rotation frequency information included in the MAC address rotation policy in association with the first wireless device.

Device information obtained for each wireless device of the plurality of wireless devices may include one or more of a type of a wireless device; a firmware version for a wireless device; an operating system version of a wireless device; a manufacturer of a wireless device; one or more applications operating via a wireless device; or operational behavior of a wireless device.

The policy server may include or otherwise be configured with a plurality of MAC address rotation policies. In one embodiment, each of a particular MAC address rotation policy of the plurality of MAC address rotation policies includes: a combination of device information that is to be used to identify the particular MAC address rotation policy; and rotation frequency information that indicates one of: a period of time for which MAC address rotations are to be performed for the particular MAC address rotation policy; or that no MAC address rotations are to be performed for the particular MAC address rotation policy.

In one instance, the method may further include determining, following the triggering, that the first wireless device does not support MAC address rotations, and storing an indication for the first wireless device that indicates that no address rotations are to be performed for the first wireless device. In one instance the method may further include associating another MAC address rotation policy with a second wireless device of the plurality of wireless devices based on device information obtained for the second wireless device, wherein the MAC address rotation policy associated with the second wireless device indicates that no MAC address rotations are to be performed for the second wireless device. In one instance, the second wireless device is associated with a class of wireless devices that are capable of performing MAC address rotations.

The methods presented herein may be embodied in a non-transitory computer readable storage medium comprising instructions that when executed configure one or more processors to perform the operations of the method.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method for a policy server of a wireless network infrastructure, comprising:
    obtaining device information for each of a wireless device of a plurality of wireless devices connected to the wireless network infrastructure;
    associating a first wireless device of the plurality of wireless devices with a first Media Access Control (MAC) address rotation policy based on first device information obtained for the first wireless device by matching the first device information obtained for the first wireless device with configured device information of the first MAC address rotation policy, wherein the first MAC address rotation policy identifies first MAC address rotation frequency information that is to be stored in association with the first wireless device;

determining that a MAC address rotation is to be performed for the first wireless device based on the first MAC address rotation frequency information; and triggering the MAC address rotation for the first wireless device via the wireless network infrastructure based on the first MAC address rotation frequency information.

2. The method of claim 1, wherein the first MAC address rotation policy is associated with a class of wireless devices that includes the first wireless device.

3. The method of claim 1, wherein the device information obtained for each wireless device of the plurality of wireless devices, includes one or more of:
   a type of a wireless device;
   a firmware version for a wireless device;
   an operating system version for a wireless device;
   a manufacturer of a wireless device;
   one or more applications operating via a wireless device; or
   operational behavior of a wireless device.

4. The method of claim 1, wherein the policy server includes a plurality of MAC address rotation policies configured for each of a plurality of different classes of wireless devices.

5. The method of claim 4, wherein each of a particular MAC address rotation policy of the plurality of MAC address rotation policies includes:
   a combination of configured device information that is to be used to identify the particular MAC address rotation policy; and
   rotation frequency information that indicates one of:
      a period of time for which MAC address rotations are to be performed for the particular MAC address rotation policy; or
      that no MAC address rotations are to be performed for the particular MAC address rotation policy.

6. The method of claim 1, wherein the wireless network infrastructure further comprises at least one wireless controller or at least one wireless access point.

7. The method of claim 1, further comprising:
   determining, following the triggering, that the first wireless device does not support MAC address rotations; and
   storing an indication for the first wireless device that indicates that no address rotations are to be performed for the first wireless device.

8. The method of claim 1, further comprising:
   associating a second MAC address rotation policy with a second wireless device of the plurality of wireless devices based on second device information obtained for the second wireless device, wherein the second MAC address rotation policy associated with the second wireless device indicates that no MAC address rotations are to be performed for the second wireless device.

9. The method of claim 8, wherein the second wireless device is associated with a class of wireless devices that are capable of performing MAC address rotations.

10. One or more non-transitory computer readable storage media encoded with instructions that, when executed by a processor, cause the processor to perform operations, comprising:
    obtaining device information for each of a wireless device of a plurality of wireless devices connected to a wireless network infrastructure;
    associating a first wireless device of the plurality of wireless devices with a first Media Access Control (MAC) address rotation policy based on first device information obtained for the first wireless device by matching the first device information obtained for the first wireless device with configured device information of the first MAC address rotation policy, wherein the first MAC address rotation policy identifies MAC address rotation frequency information that is to be stored in association with the first wireless device;
    determining that a MAC address rotation is to be performed for the first wireless device based on the MAC address rotation frequency information; and
    triggering the MAC address rotation for the first wireless device via the wireless network infrastructure based on the MAC address rotation frequency information.

11. The media of claim 10, wherein the first MAC address rotation policy is associated with a class of wireless devices that includes the first wireless device.

12. The media of claim 10, wherein a plurality of MAC address rotation policies are configured for each of a plurality of different classes of wireless devices.

13. The media of claim 12, wherein each of a particular MAC address rotation policy of the plurality of MAC address rotation policies includes:
    a combination of configured device information that is to be used to identify the particular MAC address rotation policy; and
    rotation frequency information that indicates one of:
       a period of time for which MAC address rotations are to be performed for the particular MAC address rotation policy; or
       that no MAC address rotations are to be performed for the particular MAC address rotation policy.

14. A policy server of a wireless network infrastructure, the policy server comprising:
    at least one memory element for storing data; and
    at least one processor for executing instructions associated with the data, wherein executing the instructions causes the policy server to perform operations, comprising:
       obtaining device information for each of a wireless device of a plurality of wireless devices connected to the wireless network infrastructure;
       associating a first wireless device of the plurality of wireless devices with a first Media Access Control (MAC) address rotation policy based on first device information obtained for the first wireless device by matching the first device information obtained for the first wireless device with configured device information of the first MAC address rotation policy, wherein the first MAC address rotation policy identifies MAC address rotation frequency information that is to be stored in association with the first wireless device;
       determining that a MAC address rotation is to be performed for the first wireless device based on the MAC address rotation frequency information; and
       triggering the MAC address rotation for the first wireless device via the wireless network infrastructure based on the MAC address rotation frequency information.

15. The policy server of claim 14, wherein the first MAC address rotation policy is associated with a class of wireless devices that includes the first wireless device.

16. The policy server of claim 14, wherein executing the instructions causes the policy server to perform further operations, comprising:

determining, following the triggering, that the first wireless device does not support MAC address rotations; and storing an indication for the first wireless device that indicates that no address rotations are to be performed for the first wireless device.

17. The policy server of claim 14, wherein the device information obtained for each wireless device of the plurality of wireless devices, includes one or more of:

a type of a wireless device;
   a firmware version for a wireless device;
   an operating system version for a wireless device;
   a manufacturer of a wireless device;
   one or more applications operating via a wireless device; or
   operational behavior of a wireless device.

18. The policy server of claim 14, wherein the policy server includes a plurality of MAC address rotation policies configured for each of a plurality of different classes of wireless devices.

19. The policy server of claim 18, wherein each of a particular MAC address rotation policy of the plurality of MAC address rotation policies includes:

a combination of configured device information that is to be used to identify the particular MAC address rotation policy; and rotation frequency information that indicates one of:

a period of time for which MAC address rotations are to be performed for the particular MAC address rotation policy; or that no MAC address rotations are to be performed for the particular MAC address rotation policy.

20. The policy server of claim 14, wherein executing the instructions causes the policy server to perform further operations, comprising:

associating a second MAC address rotation policy with a second wireless device of the plurality of wireless devices based on second device information obtained for the second wireless device, wherein the second MAC address rotation policy associated with the second wireless device indicates that no MAC address rotations are to be performed for the second wireless device and wherein the second wireless device is associated with a class of wireless devices that are capable of performing MAC address rotations.

\* \* \* \* \*